(12) United States Patent
Mori

(10) Patent No.: US 9,955,111 B2
(45) Date of Patent: Apr. 24, 2018

(54) ELECTRONIC APPARATUS AND DISPLAY CONTROL METHOD

(71) Applicant: CANON KABUSHIKI KAISHA, Tokyo (JP)

(72) Inventor: Tomokazu Mori, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/194,353

(22) Filed: Jun. 27, 2016

(65) Prior Publication Data

US 2017/0006231 A1 Jan. 5, 2017

(30) Foreign Application Priority Data

Jul. 1, 2015 (JP) ................................. 2015-132583

(51) Int. Cl.
*H04N 5/92* (2006.01)

(52) U.S. Cl.
CPC ................................. *H04N 5/9201* (2013.01)

(58) Field of Classification Search
None
See application file for complete search history.

(56) References Cited

U.S. PATENT DOCUMENTS

| 2014/0003732 A1* | 1/2014 | Le Floch | G06T 9/007 382/233 |
| 2014/0267762 A1* | 9/2014 | Mullis | H04N 9/093 348/164 |

FOREIGN PATENT DOCUMENTS

| JP | 2011-133849 A | 7/2011 |
| JP | 2014-220598 A | 11/2014 |

* cited by examiner

*Primary Examiner* — Mark T Monk
(74) *Attorney, Agent, or Firm* — Canon USA, Inc. I.P. Division

(57) ABSTRACT

An image display apparatus includes a data acquisition unit configured to acquire pieces of LF image data in which a corresponding focus position being an in-focus position in a depth direction is changeable after image capturing, and pieces of added data each of which is associated with a position in the depth direction, a group identification unit configured to identify a group to which at least one of the pieces of added data belongs, an image generation unit configured to generate, from pieces of image data associated with one or more pieces of added data belonging to an identified group, each of a plurality of refocused images with a corresponding focus position set to a position associated with one or more pieces of added data belonging to the group, and a display control unit configured to display the plurality of refocused images on a screen.

17 Claims, 18 Drawing Sheets

FIG.10

| ID NUMBER | GROUP | FOCUS POSITION | TEXT INFORMATION |
|---|---|---|---|
| 1 | DIAGNOSIS BY DOCTOR A | 2 | ABNORMALITY IS OBSERVED IN SITE AA |
| 2 | DIAGNOSIS BY DOCTOR B | 5 | ABNORMALITY IS OBSERVED IN SITE BB |
| 3 | DIAGNOSIS BY DOCTOR C | 3 | ABNORMALITY IN SITE CC IS SLIGHTLY SUSPECTED |
| 4 | DIAGNOSIS BY CLINICIAN D | 7 | ABNORMALITY IS OBSERVED IN SITE DD |
| 5 | DIAGNOSIS BY DOCTOR A | 9 | SITE EE NEEDS FOLLOW-UP |

ELECTRONIC APPARATUS AND DISPLAY CONTROL METHOD

BACKGROUND OF THE INVENTION

Field of the Invention

The present invention relates to electronic apparatuses for displaying images and display control methods.

Description of the Related Art

In recent years, image capturing apparatuses called light field (hereinafter, sometimes abbreviated to "LF") cameras have been put into practical use. In the image capturing apparatuses, a microlens array is placed on an image sensor, and light beams having entered the image capturing apparatus are divided by the microlenses, whereby LF image data is generated that contains light beam information and direction information. The light beam information indicates the intensities of the light beams arriving from a plurality of directions, and the direction information indicates incident directions. Japanese Patent Application Laid-Open No. 2014-220598 discusses an image processing apparatus configured to perform computation processing based on light beam information and direction information to sequentially display a plurality of refocused images with different in-focus positions (hereinafter, "focus positions") in a depth direction so that the user can search for a desired image with ease.

Further, a method is known in which an image is displayed together with added data (hereinafter, "annotation") containing a description about the image. Japanese Patent Application Laid-Open No. 2011-133849 discusses an information processing apparatus configured to display an annotation together with an image captured by a microscope.

Meanwhile, a user viewing the images has needs to preferentially view an image to which an annotation containing a description of concern is attached. For example, a doctor diagnosing an illness by examining medical images has needs to increase efficiency in diagnostic work by selectively viewing an image to which an annotation containing a description of useful information for the diagnosis is added.

However, in the cases where a plurality of refocused images is sequentially displayed as in the conventional image processing apparatuses, there has been a problem that it takes a long time for a user to find an image to which an annotation of interest to the user is added.

SUMMARY OF THE INVENTION

According to an aspect of the present invention, an electronic apparatus includes a data acquisition unit configured to acquire each of a plurality of pieces of light-field image data in which a corresponding focus position being an in-focus position in a depth direction is respectively changeable after image capturing, and a plurality of pieces of data each of which is added to a different one of the plurality of pieces of light-field image data and associated with a position in the depth direction, a group identification unit configured to identify a group to which at least one of the plurality of pieces of added data acquired by the data acquisition unit belongs, an image generation unit configured to generate, from the plurality of pieces of light-field image data associated with the one or more pieces of added data belonging to the group identified by the group identification unit, each of a plurality of refocused images with the corresponding focus position set to a position associated with the one or more pieces of added data belonging to the group, and a display control unit configured to display the plurality of refocused images on a display unit.

According to another aspect of the present invention, a display control method includes acquiring each of a plurality of pieces of light-field image data in which a corresponding focus position being an in-focus position in a depth direction is changeable after image capturing, and a plurality of pieces of data each of which is added to a different one of the plurality of pieces of light-field image data and associated with a position in the depth direction, identifying a group to which at least one of the plurality of pieces of added data acquired by the acquiring belongs, generating, from the plurality of pieces of light-field image data associated with the one or more pieces of added data belonging to the identified group, each of a plurality of refocused images with the corresponding focus position set to a position associated with the one or more pieces of added data belonging to the group, and displaying the plurality of refocused images on a display unit.

Further features of the present invention will become apparent from the following description of exemplary embodiments with reference to the attached drawings.

BRIEF DESCRIPTION OF THE DRAWINGS

FIG. 10 illustrates an example of annotations.

DESCRIPTION OF THE EMBODIMENTS

[General Description of Light Field (LF) Camera]

Figure 1A:
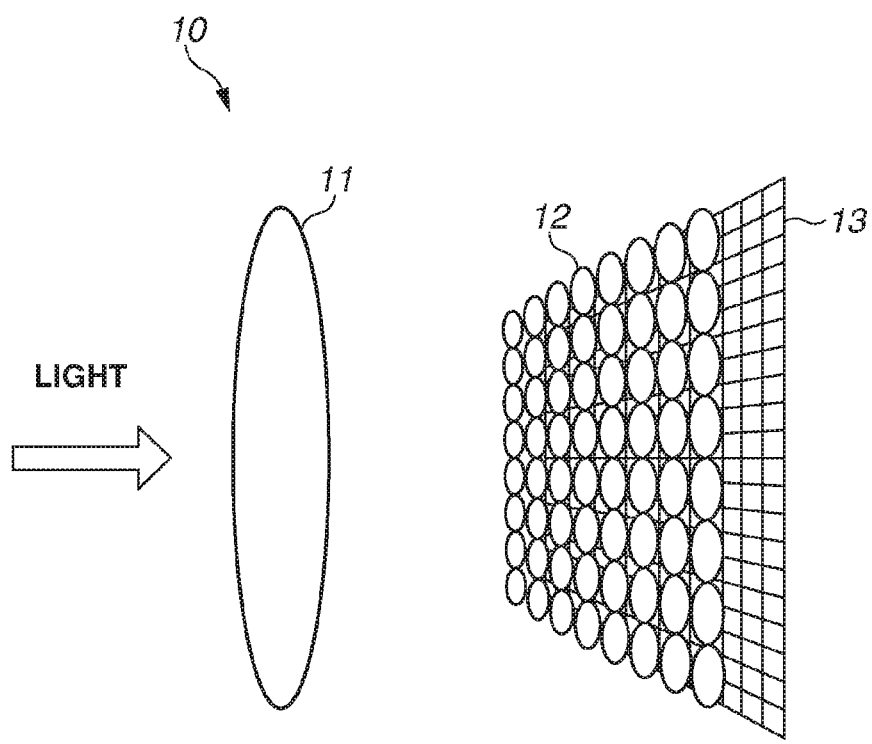
FIG. 1A is a first schematic view illustrating the configuration of an image capturing apparatus as a light field (LF) camera.
Figure 1B:
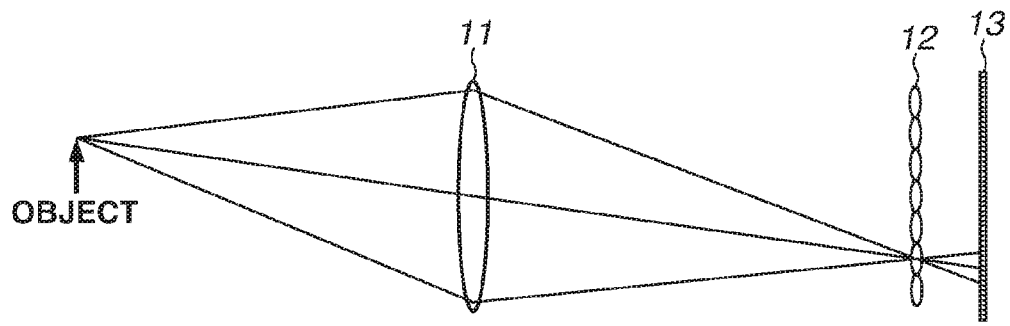
FIG. 1B is a second schematic view illustrating the configuration of an image capturing apparatus serving as a LF camera.

Prior to the description of an image processing apparatus according to an exemplary embodiment of the present invention, the following briefly describes a LF camera. FIG. 1 is a schematic view illustrating the configuration of an image capturing apparatus 10 serving as a LF camera. The image capturing apparatus 10 includes an imaging lens 11, a microlens array 12, and an image sensor 13. Light from an object passes through the imaging lens 11 and the microlens array 12, which form an imaging optical system, and then enters the image sensor 13. The image sensor 13 converts the incident light into electrical signals and outputs the converted electrical signals. Based on the electrical signals output from the image sensor 13, the image capturing apparatus 10 generates LF image data in which a focus position that is an in-focus position can be changed.

The imaging lens 11 projects light from an object onto the microlens array 12. The imaging lens 11 is a replaceable lens that is attached to a main body part of the image capturing apparatus 10 and used. A user of the image capturing apparatus 10 can change the imaging magnification by performing a zooming operation on the imaging lens 11.

The microlens array 12 includes a plurality of very small lenses (microlenses) arranged in the form of a grid and is located between the imaging lens 11 and the image sensor 13. Each of the microlenses included in the microlens array 12 divides incident light beams from the imaging lens 11, and the plurality of divided light beams enters a plurality of pixels of the image sensor 13.

The image sensor 13 is an imaging device including the plurality of pixels and detects the intensity of light at each pixel. Light beams that are divided by the respective microlenses corresponding to the pixels of the image sensor 13, which is configured to receive light from an object, and have different directions from each other enter the respective pixels corresponding to the microlenses.

Figure 2:
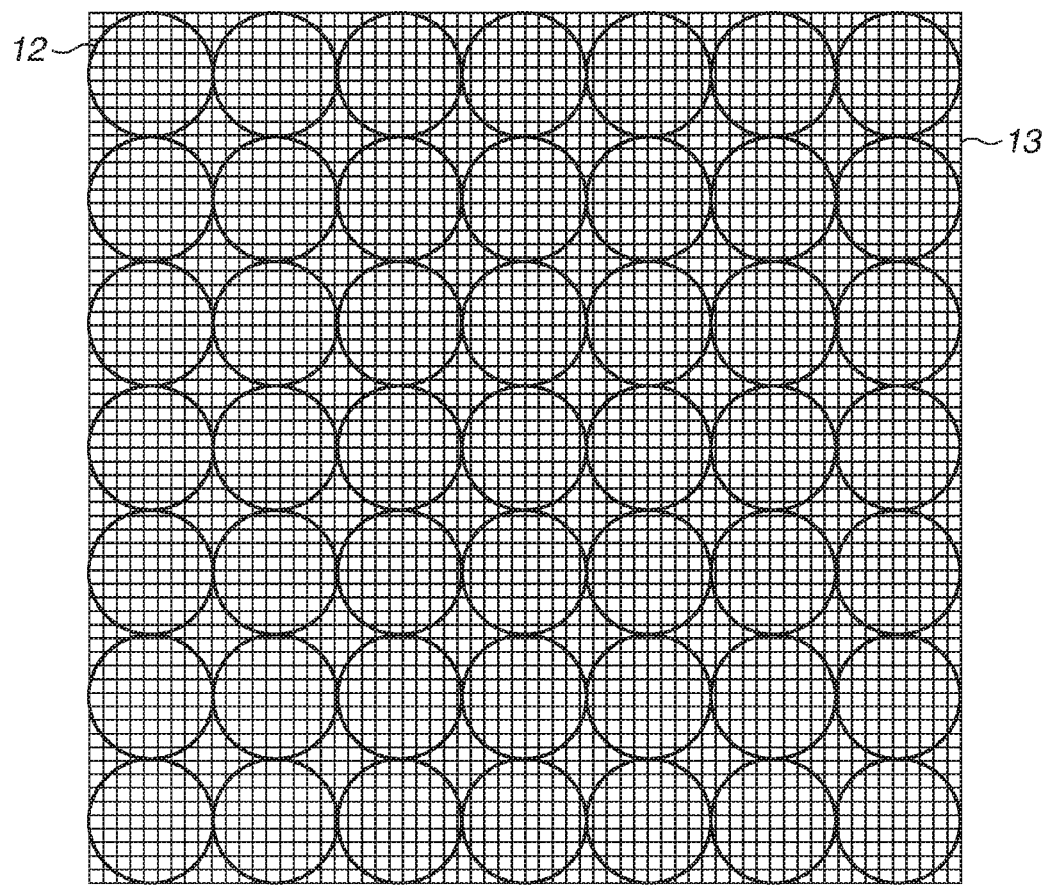
FIG. 2 is a schematic view illustrating the positional relationship between a microlens array and an image sensor.

FIG. 2 is a schematic view illustrating the positional relationship between the microlens array 12 and the respective pixels of the image sensor 13. The microlenses of the microlens array 12 are arranged to each correspond to a plurality of pixels of the image sensor 13. Light beams divided by respective microlenses of the microlens array 12, corresponding to pixels enter the pixels of the image sensor 13, and the image sensor 13 detects the intensities of the light beams from different directions at the respective pixels. The image capturing apparatus 10 generates light beam information that indicates the intensities of light beams detected at the respective pixels of the image sensor 13.

The incident directions of light beams incident on the respective pixels of the image sensor 13 via the microlenses are determined according to the locations of the plurality of pixels corresponding to the respective microlenses. Therefore, the incident directions are identified based on the positional relationship between the respective microlenses and the respective pixels of the image sensor 13, and the image capturing apparatus 10 generates, for example, coordinate information for identifying a pixel as direction information that indicates the identified incident direction.

Light beams from an object enter the microlens array 12 from the directions determined according to the distance between the object and the imaging lens 11. Then, the light beams from the object pass through a plurality of microlenses determined according to the distance between the object and the imaging lens 11 and then enter the image sensor 13. Consequently, an image focused on a plane having different distances from lens peak planes of the microlens array 12 can be acquired by combining outputs of the plurality of pixels of the image sensor 13 that is located in positions corresponding to the decentering amounts from respective optical axes of the microlenses. Accordingly, the image capturing apparatus 10 can generate image data corresponding to an arbitrary focus position by rearranging the light beams and performing calculation processing (hereinafter, "reconstruction") based on the light beam information and the direction information. As used herein, the term "focus position" refers to an in-focus position, and the user can acquire refocused image data corresponding to a desired focus position based on LF image data after the image is captured.

Figure 3A:
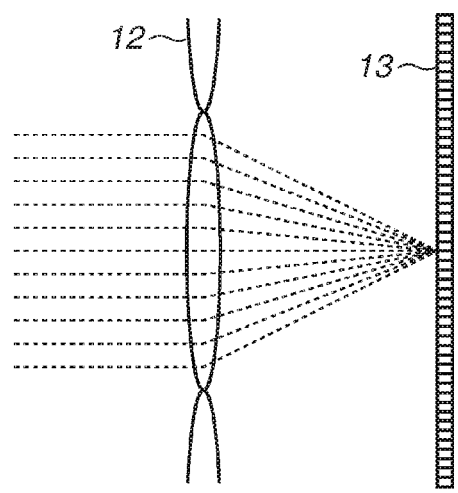
FIG. 3A is a first schematic view illustrating the relationship between traveling directions of light beams incident on a microlens of a microlens array and a recording area of an image sensor.
Figure 3B:
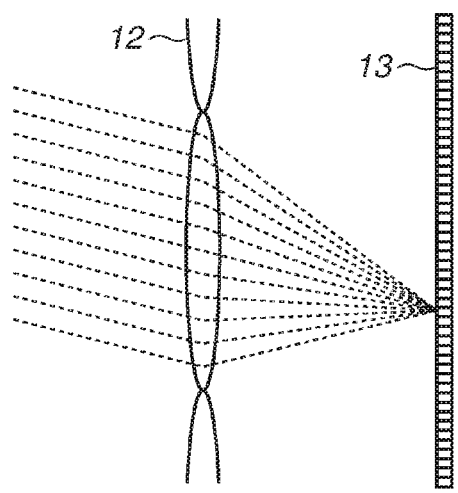
FIG. 3B is a second schematic view illustrating the relationship between traveling directions of light beams incident on a microlens of a microlens array and a recording area of an image sensor.

FIG. 3 is a schematic view illustrating the relationship between traveling directions of light beams incident on a microlens of the microlens array 12 and a recording area of the image sensor 13.

An object image by the imaging lens 11 is formed on the microlens array 12, and light beams incident on the microlens array 12 are received by the image sensor 13 via the microlens array 12. At this time, as illustrated in FIG. 3, the light beams incident on the microlens array 12 are received at different positions on the image sensor 13 according to the traveling direction determined for each focus position, and an object image is formed for each microlens.

Figure 4:
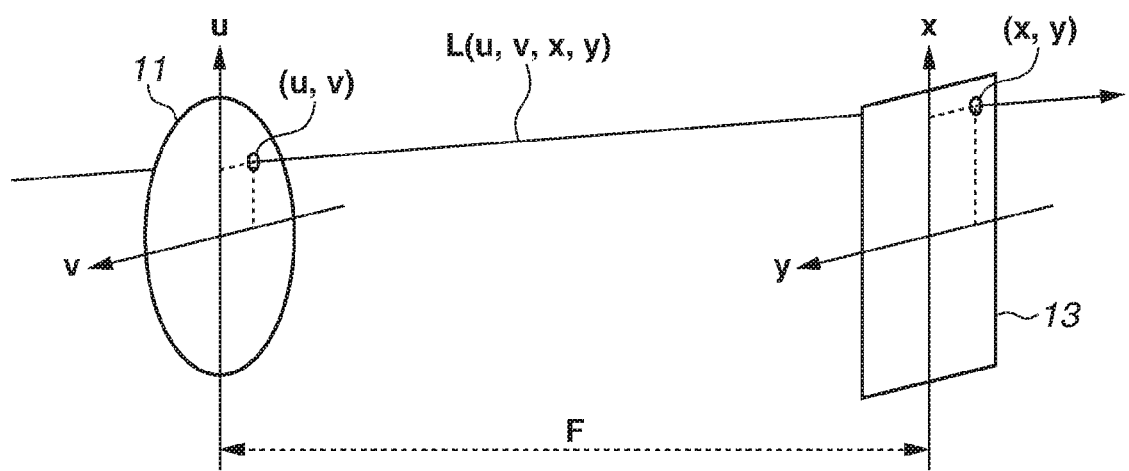
FIG. 4 is a schematic view illustrating information about light beams incident on an image sensor.

FIG. 4 is a schematic view illustrating information about a light beam incident on the image sensor 13.

The following describes a light beam received by the image sensor 13, with reference to FIG. 4. As used herein, (u, v) is a Cartesian coordinate system on a lens plane of the imaging lens 11, and (x, y) is a Cartesian coordinate system on an image capturing plane of the image sensor 13. Further, F is the distance between the lens plane of the imaging lens 11 and the image capturing plane of the image sensor 13. In this case, the intensity of a light beam that passes through the imaging lens 11 and the image sensor 13 can be expressed by a four-dimensional function L (u, v, x, y) specified in FIG. 4. Light beams incident on the respective microlenses enter different pixels depending on the traveling directions, so information corresponding to the intensities of the light beams that are represented by the four-dimensional function L (u, v, x, y), which contains the traveling directions of the light beams, is recorded in the image sensor 13 in addition to positional information about the light beams.

Next, refocusing computation processing after the image capturing will be described below. The refocusing computation processing is the processing for generating refocused image data by reconstructing an image based on the intensities of light beams received at pixels corresponding to a different focus position. As used herein, the term "refocused plane" refers to a plane in an in-focus position on a refocused image.

Figure 5:
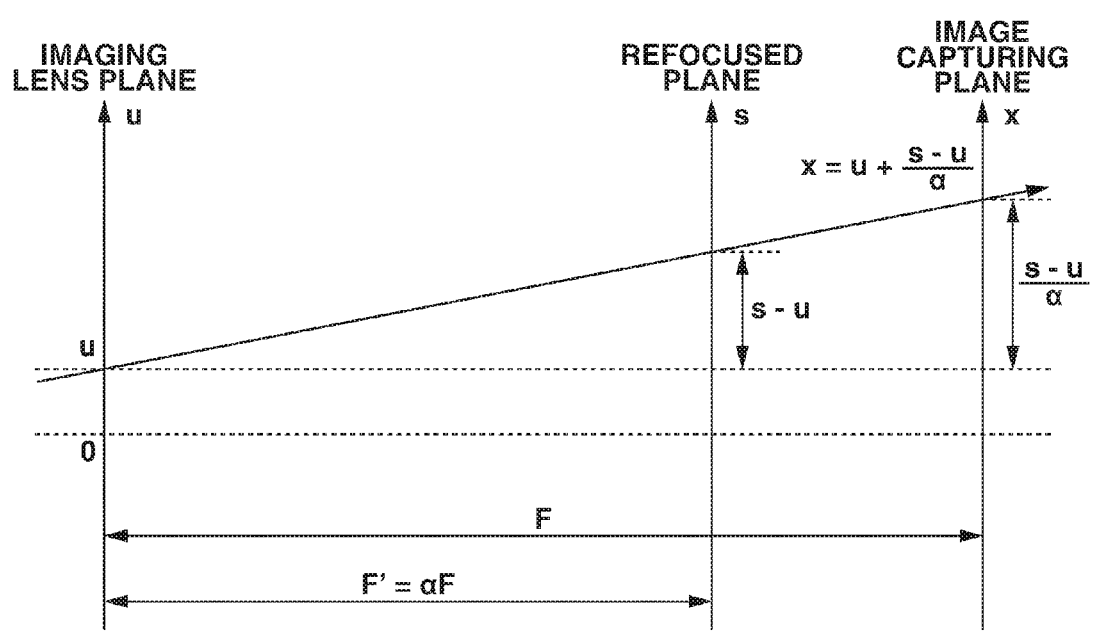
FIG. 5 is a schematic view illustrating refocusing computation processing.

FIG. 5 is a schematic view illustrating the refocusing computation processing.

In a case where the positional relationship between the imaging lens plane, the image capturing plane, and the refocused plane is set as illustrated in FIG. 5, the intensity L' (u, v, s, t) of a light beam on a Cartesian coordinate system (s, t) on the refocused plane is expressed by the following formula (1):

$$L'(u, v, s, t) = L\left[u, v, u + \frac{s-u}{\alpha}, v + \frac{t-v}{\alpha}\right]. \quad (1)$$

Further, an image E' (s, t) obtained on the refocused plane is an integral of the intensity L' (u, v, s, t) over a lens aperture and thus expressed by the following formula (2):

$$E'(s, t) = \frac{1}{\alpha^2 F^2} \int \int L\left[u, v, u + \frac{s-u}{\alpha}, v + \frac{t-v}{\alpha}\right] du dv. \quad (2)$$

Accordingly, image data corresponding to a refocused plane in an arbitrary focus position can be reconstructed by performing the refocusing computation processing based on the formula (2).

Next, depth-of-field adjustment processing after the image capturing, i.e., processing for the adjustment of a focus position in a depth direction, will be described below. In a case of adjusting the depth of field, prior to the refocusing computation processing described above, weighting is performed by multiplying, by a weight coefficient, each image data piece forming an image area distributed to each microlens. For example, in a case of generating an image with a deep depth of field, integration processing is performed using only information about a light beam incident at a relatively small angle with respect to a light-receiving surface of the image sensor 13. In other words, a light beam with a relatively large incident angle with respect to the image sensor 13 is multiplied by a weight coefficient of 0 (zero) so that information about the light beam is not included in the integration processing.

Figure 6:
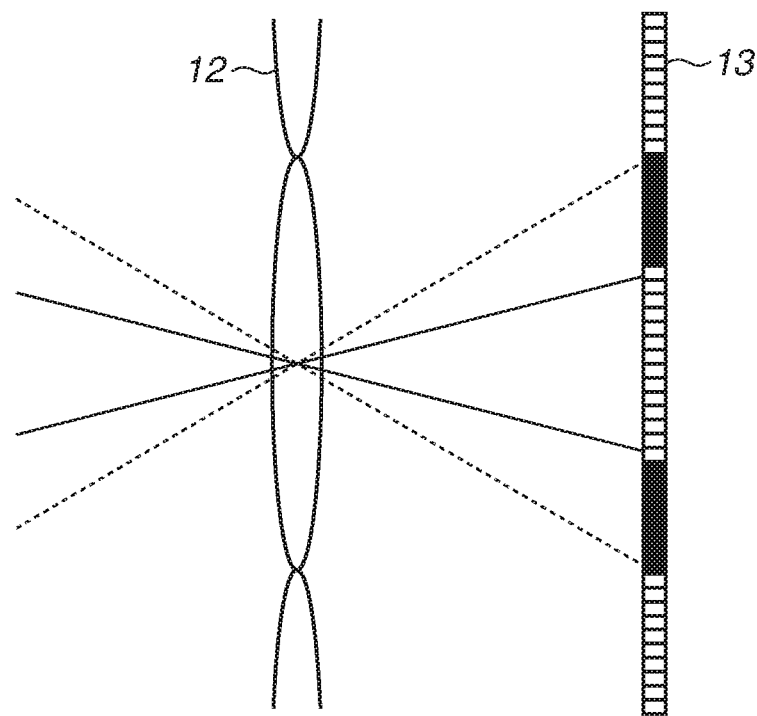
FIG. 6 is a schematic view illustrating the relationship between a difference in the angle of incidence on a microlens and a recording area of an image sensor.
Figure 7:
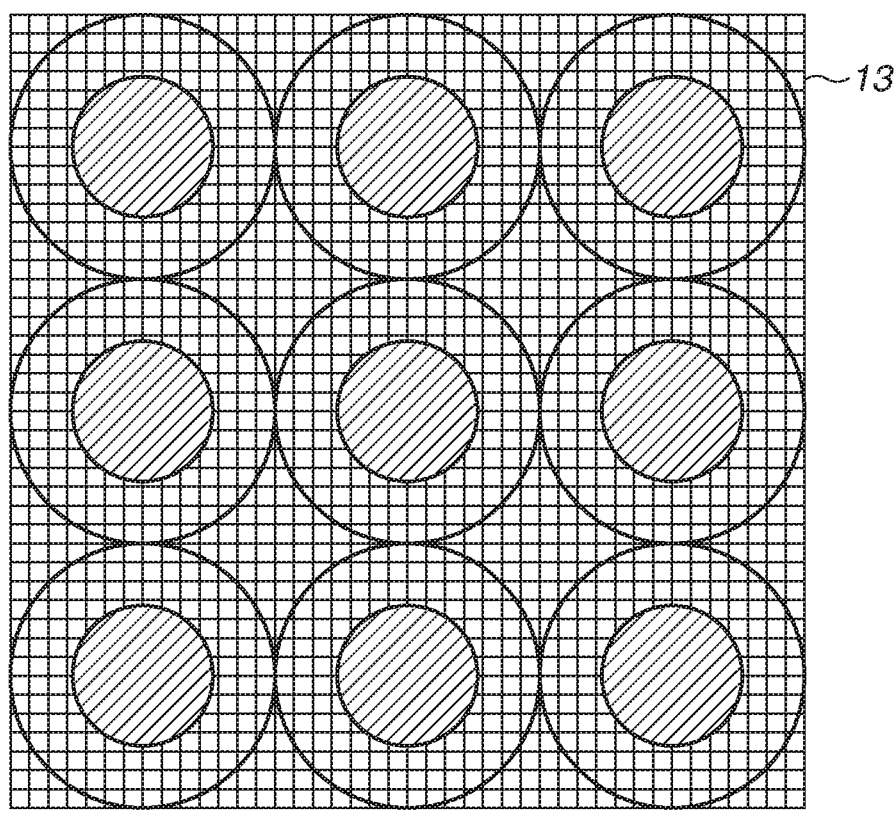
FIG. 7 is a schematic view illustrating depth-of-field adjustment processing.

FIG. 6 is a schematic view illustrating the relationship between a difference in the angle of incidence on a microlens and a recording area of the image sensor 13, and FIG. 7 is a schematic view illustrating the depth-of-field adjustment processing.

As illustrated in FIG. 6, a light beam having a relatively smaller incident angle with respect to the image sensor 13 is located in a position closer to a central area. Thus, in the case of generating an image with a deep depth of field, integration processing is performed using only pixel data pieces acquired at central portions (shaded areas in FIG. 7) of respective areas, as illustrated in FIG. 7.

By performing the foregoing processing, the image capturing apparatus 10 can express an image with a deep depth of field as though an aperture stop included in a commonly-used image capturing apparatus, etc. is limited. The image capturing apparatus 10 can also generate deep-focus image data with a deeper depth of field by using fewer pieces of pixel data of the central portions. Further, the image capturing apparatus 10 can also adjust each area to a different depth of field by using pixel data of a different position for each area of the LF image data. As described above, the image capturing apparatus 10 can adjust the depth of field of an image based on focus information including a weight coefficient for each pixel contained in the LF image data, light beam information, and direction information after the image capturing, and can set the focus position to a desired focus position. The following describes an electronic apparatus configured to display LF image data on a display and a display control method according to an exemplary embodiment.

[Configuration of Image Display Apparatus 100]

Figure 8:
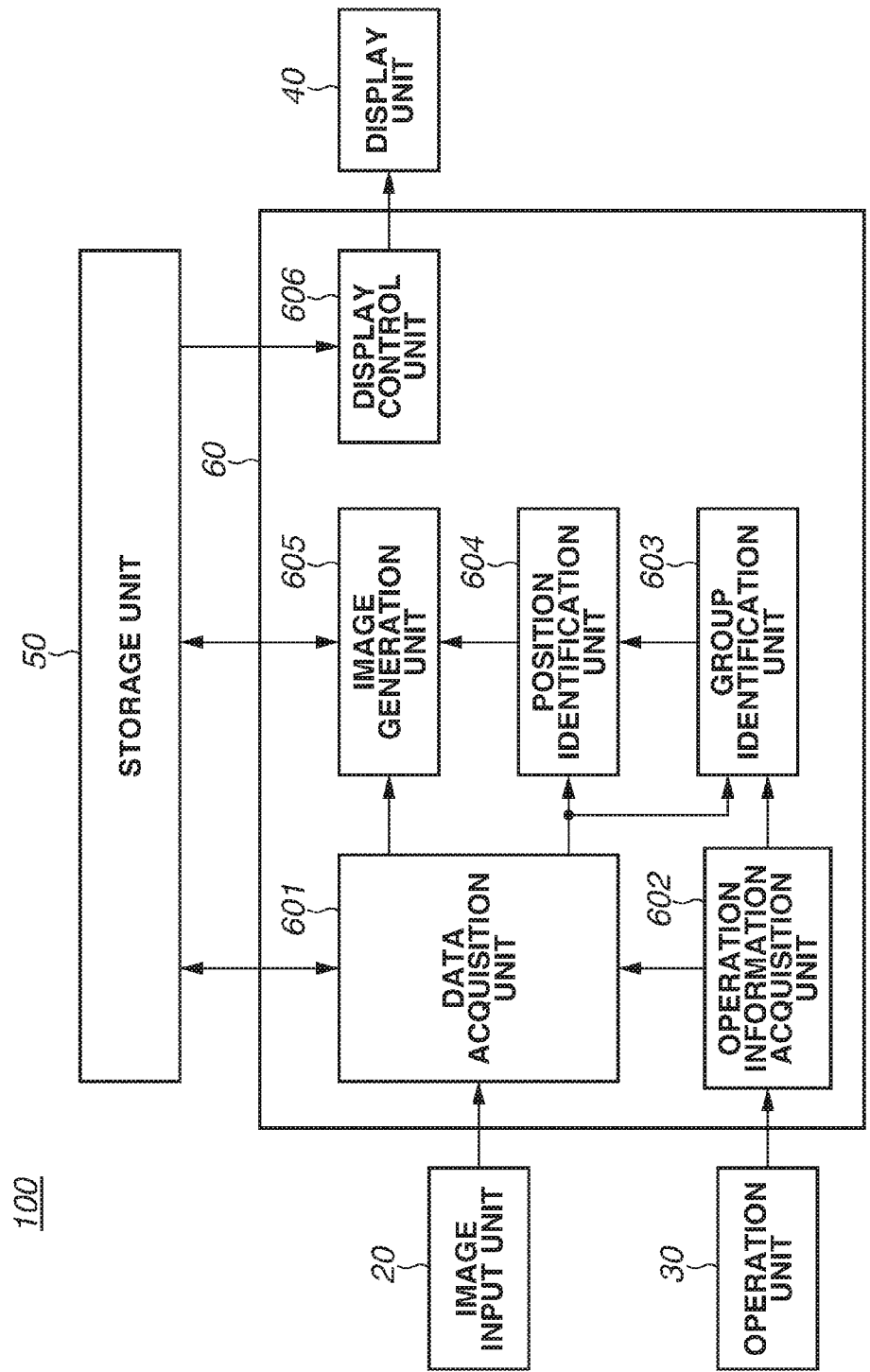
FIG. 8 illustrates the configuration of an image display apparatus that is an electronic apparatus according to a first exemplary embodiment.

The following describes a first exemplary embodiment. FIG. 8 illustrates the configuration of an image display apparatus 100, which is an electronic apparatus according to the first exemplary embodiment. The image display apparatus 100 includes an image input unit 20, an operation unit 30, a display unit 40, a storage unit 50, and a control unit 60. The image display apparatus 100 is, for example, a display, a projector, or a computer.

The image input unit 20 is an interface for receiving input of an image file containing LF image data. Examples of the image input unit 20 include a universal serial bus (USB) interface or a communication interface. The image input unit 20 receives an image file from a storage medium connected via a USB interface or an external device connected via a communication network such as Ethernet (registered trademark), etc.

Figure 9:
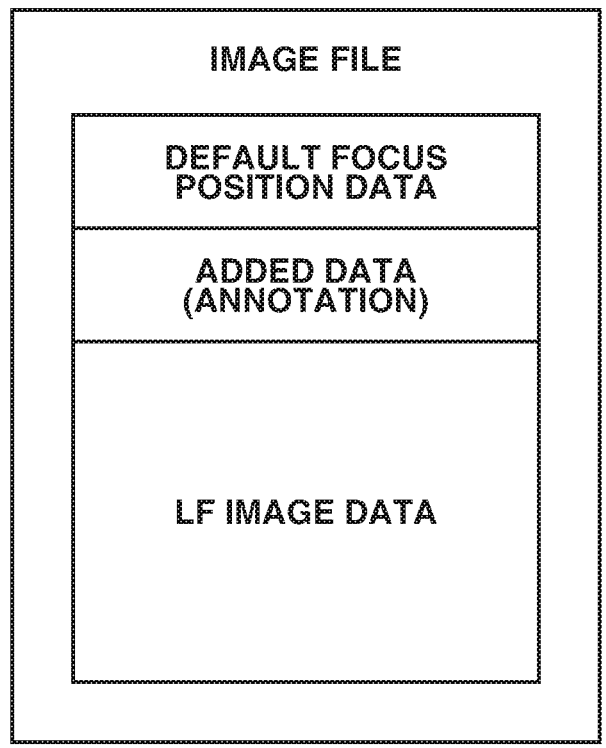
FIG. 9 illustrates an example of the configuration of an image file input to an image input unit.

FIG. 9 illustrates an example of the configuration of an image file to be input to the image input unit 20. The image file contains LF image data, an annotation, and default focus position data. The LF image data is data in which a focus position, which is an in-focus position, in the depth direction can be changed after the image capturing. The annotation is added data that is added to each LF image data piece and associated with a plurality of positions in the depth direction. The default focus position data is data that indicates a default focus position. The default focus position is a focus position used at the time when the image display apparatus 100 displays the LF image data for the first time.

FIG. 10 illustrates an example of annotations. In each annotation, "ID number" for the identification of the annotation, "group" to which the annotation belongs, "focus position" at the time point at which the annotation is added to the image, and "text information" are associated. In a case where the LF image data is medical image data, text information contained in an annotation is, for example, a finding that indicates a diagnosis result provided by a doctor at the time of diagnosis. An annotation may contain information about the date/time of capture of the image, captured site, patient name, etc. in the text information.

FIG. 10 indicates that the annotation of the ID number "1" is generated by addition of the finding "abnormality is observed in site AA" when the doctor has performed diagnosis with the focus position set to "2". Further, the item "group" specifies the name of a group (hereinafter, "group name") into which the annotation is classified based on a feature of the annotation. In a case where text information contained in an annotation is a finding by a doctor, the group name contains the name of the doctor having provided the finding.

Referring back to FIG. 8, the operation unit 30 is a device configured to receive user operations. The operation unit 30 is, for example, a touch panel superimposed and placed on a front surface of the display unit 40. When the operation unit 30 detects a touch on the front surface of the display unit 40, the operation unit 30 notifies the control unit 60 of operation information that indicates the coordinates of the touched position.

The display unit 40 is, for example, a liquid crystal display. The display unit 40 displays an operational image for user operations, text information of annotations, a refocused image acquired by reconstructing LF image data, etc.

The storage unit 50 is a storage medium such as a read-only memory (ROM), a random access memory (RAM), a hard disk, or the like. The storage unit 50 stores a program that is to be executed by the control unit 60. Further, the storage unit 50 stores LF image data and annotations that are contained in an image file input via the image input unit 20. The storage unit 50, for example, stores "ID number", "group", "focus position", and "text information" that are contained in an annotation, in association with each other. Further, in a case where a "collective focusing setting" described below is set, the storage unit 50 temporarily stores a group name that is a target of the collective focusing setting.

The control unit 60 is, for example, a central processing unit (CPU). The control unit 60 executes the program stored in the storage unit 50 to function as a data acquisition unit 601, an operation information acquisition unit 602, a group identification unit 603, a position identification unit 604, an image generation unit 605, and a display control unit 606.

The data acquisition unit 601 acquires a plurality of pieces of LF image data and a plurality of annotations via the image input unit 20. For example, the data acquisition unit 601 acquires a plurality of image files stored in a predetermined display target folder and containing LF image data and annotations. The display target folder is a folder that stores a plurality of image files to be seen by a user and is designated in advance by the user. The data acquisition unit 601 analyzes the acquired image files, extracts a plurality of pieces of LF image data and a plurality of annotations that are contained in the plurality of acquired image files, and stores the plurality of pieces of extracted LF image data and annotations in the storage unit 50.

Further, the data acquisition unit 601 outputs to the image generation unit 605 the plurality of pieces of LF image data contained in the acquired image files, and outputs the plurality of annotations to the group identification unit 603 and the position identification unit 604. Further, the data acquisition unit 601 can display on the display unit 40 via the display control unit 606 the "ID number", "group", "focus position", and "text information" that are illustrated in FIG. 10 and contained in the extracted annotations.

The operation information acquisition unit 602 acquires operation information from the operation unit 30. The operation information acquisition unit 602 calculates a mean value of a plurality of coordinates indicated by operation information input from the operation unit 30 within a predetermined time, and notifies the group identification unit 603 and the position identification unit 604 of the calculated mean value as an operation position.

The group identification unit 603 identifies a group to which at least one of the plurality of annotations acquired by the data acquisition unit 601 belongs. Specifically, the group identification unit 603 identifies a group to which at least one annotation belongs that is selected by the user from a list of the plurality of annotations displayed on the display unit 40 by the data acquisition unit 601 via the display control unit 606.

Figure 11:
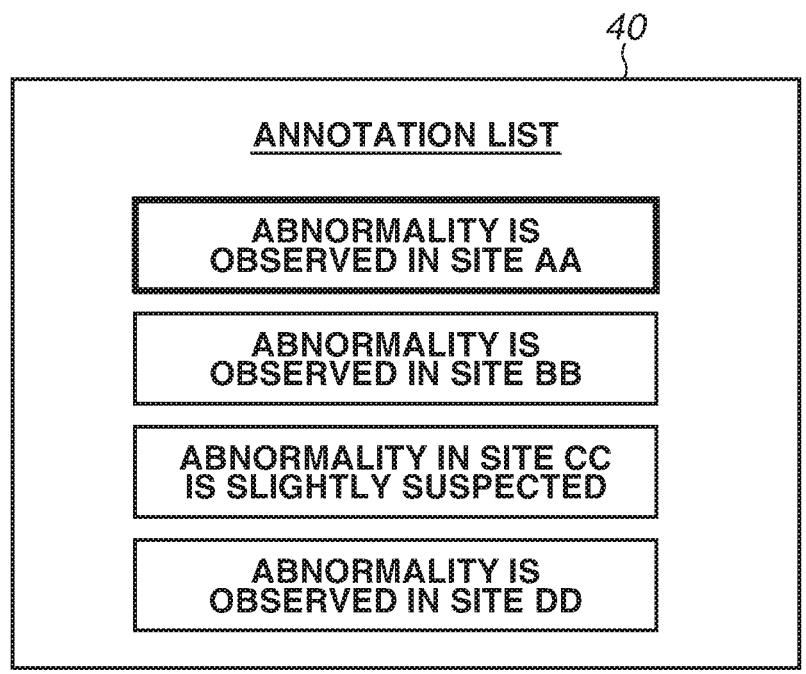
FIG. 11 illustrates a screen of a display unit that displays a list of a plurality of annotations.

FIG. 11 illustrates a screen of the display unit 40 that displays the list of the plurality of annotations. When the user selects one or more annotations from among the plurality of annotations displayed on the display unit 40, the group identification unit 603 identifies the ID number(s) of the annotation(s) selected by the user based on the operation information input from the operation information acquisition unit 602. Then, the group identification unit 603 identifies a group name associated with the annotation(s) corresponding to the identified ID number(s), i.e., the annotation(s) selected by the user, among the plurality of annotations input from the data acquisition unit 601. The group identification unit 603 notifies the position identification unit 604 of the group name corresponding to the annotation(s) selected by the user.

For example, in a case where the user selects the annotation "abnormality is observed in site AA" in FIG. 11, the group identification unit 603 identifies an annotation with the ID number "1" among the plurality of annotations illustrated in FIG. 10, and identifies the group name "diagnosis by doctor A" corresponding to the identified annotation. Then, the group identification unit 603 notifies the position identification unit 604 of the identified group name "diagnosis by doctor A".

The position identification unit 604 identifies a position corresponding to the annotation selected by the user among the annotations input from the data acquisition unit 601, based on the operation information input from the operation information acquisition unit 602. Further, the position identification unit 604 identifies a position corresponding to one or more annotations belonging to the group indicated by the group name notified from the group identification unit 603, among the annotations input from the data acquisition unit 601. The position identification unit 604 notifies the image generation unit 605 of the position corresponding to the identified annotation.

For example, the position identification unit 604 temporarily stores the group name "diagnosis by doctor A" notified from the group identification unit 603, and determines whether the group name "diagnosis by doctor A" is contained in the annotations input from the data acquisition unit 601. Then, the position identification unit 604 identifies annotations with the ID numbers "1" and "5" containing the group name "diagnosis by doctor A" in added data as illustrated in FIG. 10. The position identification unit 604 notifies the image generation unit 605 of the position "2" corresponding to the ID number "1" and the position "9" corresponding to the ID number "5".

The image generation unit 605 generates, from a plurality of pieces of LF image data associated with one or more annotations belonging to the group identified by the group identification unit 603, a plurality of refocused images with a focus position set to a position associated with one or more annotations belonging to the identified group. For example, the image generation unit 605 generates, based on a plurality of pieces of LF image data contained in a plurality of image files, a plurality of refocused images with a focus position set to a position that have been in focus at the time when a plurality of annotations belonging to the group identified by the group identification unit 603 has been added.

The image generation unit 605 performs collective focusing processing to reconstruct a plurality of refocused images to which annotations belonging to the group identified by the group identification unit 603 are added. For example, in a case where the image generation unit 605 is notified of the positions "2" and "9" by the position identification unit 604, the image generation unit 605 generates refocused image data with a focus position set to the position "2" in the LF image data input from the data acquisition unit 601, and refocused image data with a focus position set to the position "9".

The display control unit 606 displays on the display unit 40 the plurality of refocused images generated by the image generation unit 605. In a case where the collective focusing setting for performing collective focusing processing is set, the display control unit 606 displays on the display unit 40 all the refocused images with a focus position set to a position where an annotation belonging to the same group is added. On the other hand, the display control unit 606 does not display on the display unit 40 a refocused image corresponding to LF image data that does not contain an annotation belonging to the group identified by the group identification unit 603.

[Processing Procedure of Image Display Apparatus 100]

Figure 12:
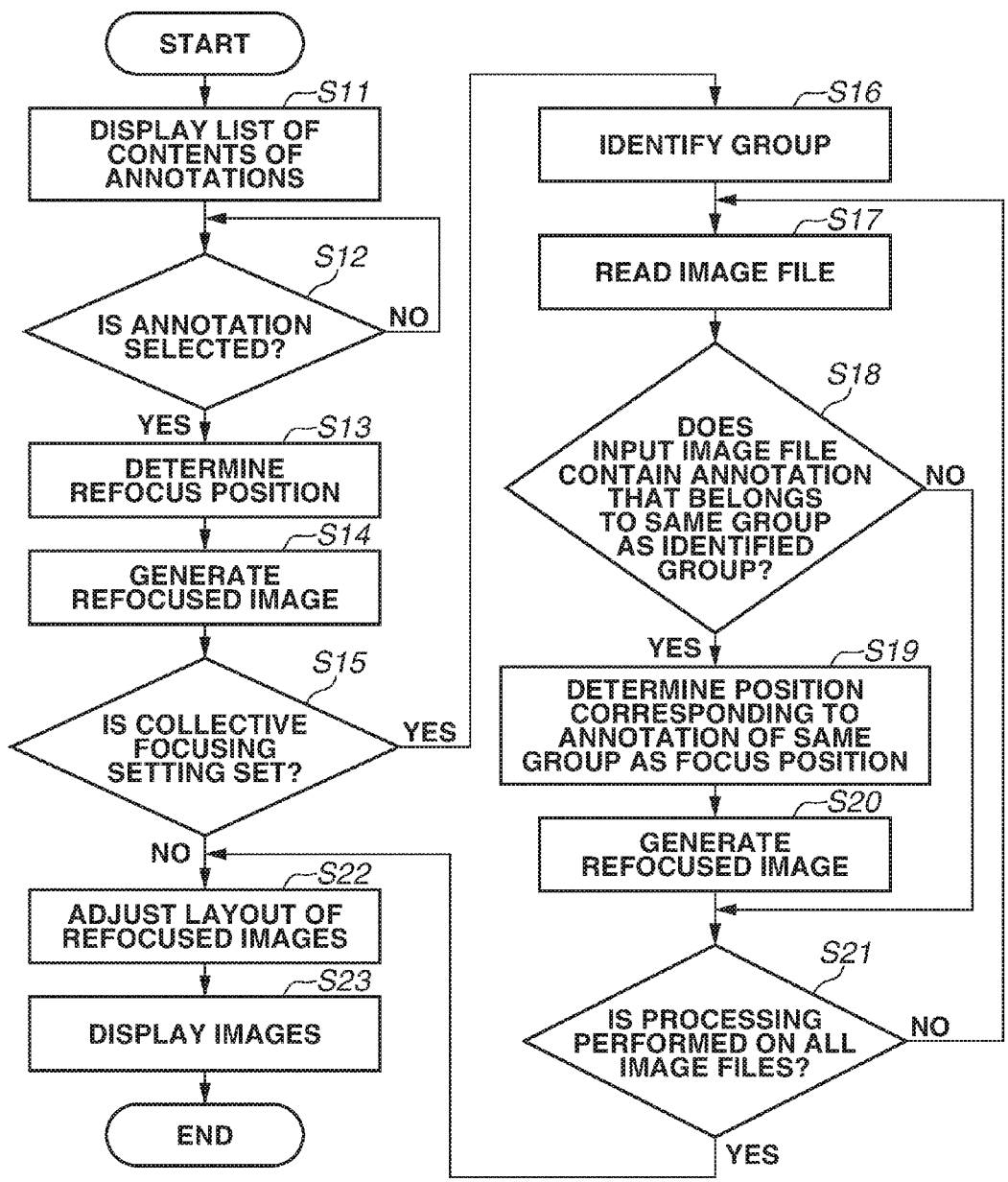
FIG. 12 is a flow chart illustrating a processing procedure of a display control method according to the first exemplary embodiment.
Figure 13A:
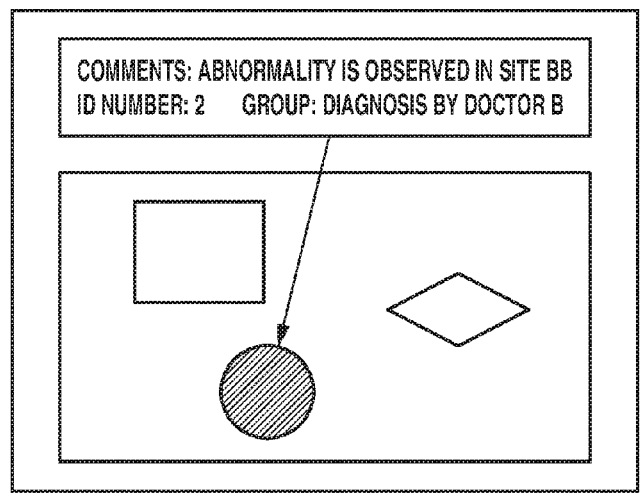
FIG. 13A is a first view illustrating a screen transition according to the first exemplary embodiment.
Figure 13B:
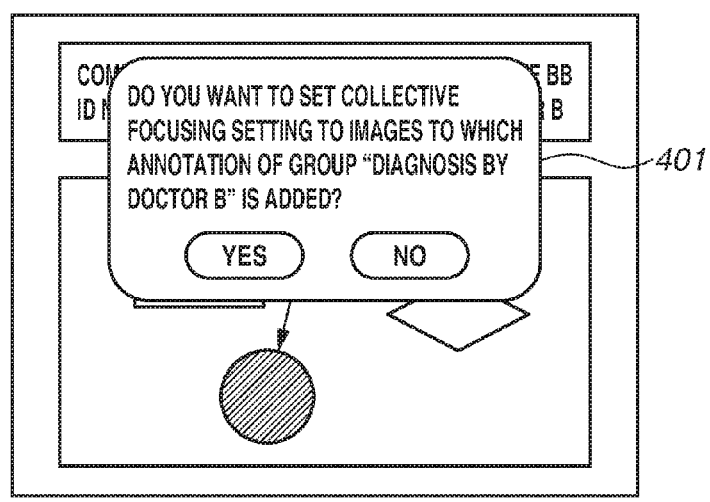
FIG. 13B is a second view illustrating a screen transition according to the first exemplary embodiment.
Figure 13C:
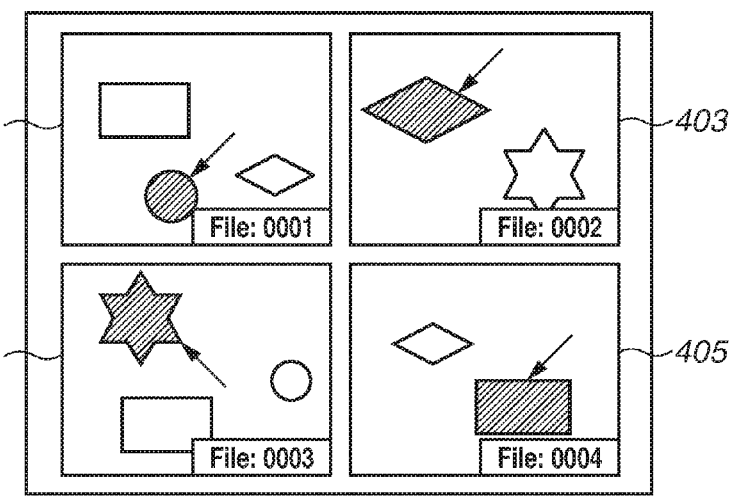
FIG. 13C is a third view illustrating a screen transition according to the first exemplary embodiment.

FIG. 12 is a flow chart illustrating a processing procedure of a display control method that is executed by the image display apparatus 100. The flow chart in FIG. 12 illustrates the processing to be performed after the user activates processing for viewing LF image data. FIGS. 13A to 13C illustrate a screen transition at the time of setting the collective focusing setting. The following describes the procedure of displaying refocused images by the image display apparatus 100, with reference to FIGS. 12, 13A, 13B, and 13C.

First, in step S11, if the data acquisition unit 601 acquires an image file via the image input unit 20, the data acquisition unit 601 extracts a plurality of annotations contained in LF image data contained in the acquired image file and displays on the display unit 40 via the display control unit 606 a list of contents of the plurality of annotations. In this state, in step S12, the operation information acquisition unit 602 stands by until an annotation is selected by the user.

If any of the annotations is selected by the user (YES in step S12), the operation information acquisition unit 602 notifies the group identification unit 603 and the position identification unit 604 of operation information for identifying the selected annotation. In step S13, the position identification unit 604 determines as a refocus position a position corresponding to an annotation indicated by the notified operation information, and notifies the image generation unit 605 of the determined position. In step S14, the image generation unit 605 generates a refocused image with a focus position set to the notified position, and displays the generated refocused image on the display unit 40 via the display control unit 606.

FIG. 13A illustrates a screen that is displayed when an annotation of the ID number "2" is selected by the user. In the example illustrated in FIG. 13A, the focus position is set to "5", and a refocused image focused on a circle shown with oblique lines, the text information "abnormality is observed in site BB" corresponding to the focus position "5", the ID number of the annotation, and the group name of the annotation are displayed.

Then, the display control unit 606 displays on the display unit 40 an operation image for setting a collective focusing setting. FIG. 13B illustrates a screen displaying an operation image 401 via which the user selects whether to set the collective focusing setting. In the example illustrated in FIG. 13B, the operation image 401 is superimposed and displayed on the screen illustrated in FIG. 13A. If the user touches "YES" on the operation image 401 (YES in step S15), the operation information acquisition unit 602 notifies the group identification unit 603 of operation information indicating that a collective focusing setting operation is performed.

In step S16, when the group identification unit 603 receives the input of the operation information, the group identification unit 603 identifies a group to which the annotation selected in step S12 by the user belongs. The group identification unit 603 may temporarily store in the storage unit 50 a group name that indicates the identified group.

Then, the data acquisition unit 601 starts reading an image file contained in the folder of the image file of which the refocused image is displayed in step S14. In step S17, when the data acquisition unit 601 reads one image file, the data acquisition unit 601 outputs the read image file to the position identification unit 604. In step S18, the position identification unit 604 determines whether the input image file contains an annotation that belongs to the same group as the group identified by the group identification unit 603 in step S16.

If the position identification unit 604 determines that the input image file does not contain an annotation of the same group (NO in step S18), the processing proceeds to step S21. On the other hand, if the position identification unit 604 determines that the input image file contains an annotation of the same group (YES in step S18), then in step S19, the data acquisition unit 601 determines as a focus position a position corresponding to the annotation of the same group. The position identification unit 604 notifies the image generation unit 605 of the position determined as the focus position. In step S20, the image generation unit 605 generates a refocused image with a focus position set to the notified position and stores the generated refocused image in the storage unit 50.

Then, in step S21, the data acquisition unit 601 determines whether the processing of steps S17 to S20 has been performed on all the image files contained in the same folder. If the data acquisition unit 601 determines that the processing on all the image files is not completed (NO in step S21), the processing returns to step S17, and the data acquisition unit 601 reads a new image file. On the other hand, if the data acquisition unit 601 determines that the processing on all the image files is completed (YES in step S21), the data acquisition unit 601 notifies the image generation unit 605 that the processing on all the image files is completed, and the processing proceeds to step S22.

In step S22, the image generation unit 605 adjusts the layout of all the refocused images generated in step S20, and generates a display image containing the plurality of refocused images. Then, the image generation unit 605 simultaneously displays the plurality of refocused images via the display control unit 606 as illustrated in FIG. 13C. FIG. 13C illustrates a screen that displays thumbnail images of four refocused images. In the example illustrated in FIG. 13C, thumbnail images 402 to 405 of respective refocused images that are focused on objects shown with oblique lines are displayed.

For example, the thumbnail image 402 corresponding to "File:0001" is displayed with a focus on a round object on the image, as a result of setting the focus position to the position associated with the annotation that belongs to the group "diagnosis by doctor B". Similarly, the thumbnail image 403 corresponding to "File:0002" is displayed with a focus on a rhombic object. The thumbnail image 404 corresponding to "File:0003" is displayed with a focus on a six-pointed star-shaped object. The thumbnail image 405 corresponding to "File:0004" is displayed with a focus on a rectangular object.

As described above, the user can collectively view various findings contained in a plurality of pieces of LF image data and belonging to the group "diagnosis by doctor B" without repeating a focus setting operation again and again. In a case where the display control unit 606 displays a plurality of refocused images on the display unit 40, instead of displaying a screen divided as illustrated in FIG. 13C, the plurality of refocused images and annotations may be displayed one after another for a predetermined time as in a slide show.

Advantage of First Exemplary Embodiment

As the foregoing describes, the image display apparatus 100 according to the first exemplary embodiment displays contents of a plurality of annotations on the display unit 40 so that the user can check the contents of the plurality of annotations and select a desired annotation. Then, the image display apparatus 100 generates a plurality of refocused images with a focus position set to a position where an annotation belonging to the same group as the annotation selected by the user is added, among a plurality of pieces of LF image data, and displays a list of the generated refocused images. In this way, images that the user desires to view can collectively be displayed without repeating a focus setting operation so that the user can select an image that the user desires to view. Accordingly, the image display apparatus 100 enables the user to view with ease a refocused image in which the user is interested.

The following describes a second exemplary embodiment. The image display apparatus 100 according to the first exemplary embodiment displays contents of a plurality of annotations on the display unit 40 and then displays on the display unit 40 a refocused image with a focus position set to a position where an annotation belonging to the same group as an annotation selected by the user is added. The second exemplary embodiment is different from the first exemplary embodiment in that an image display apparatus 100 according to the second exemplary embodiment displays a list of a plurality of group names on a display unit 40 so that the user can select a group of which a refocused image the user desires to view.

A group identification unit 603 according to the present exemplary embodiment identifies a group corresponding to one group name selected from a plurality of groups of a list displayed by a display control unit 606. Specifically, the display control unit 606 displays on the display unit 40 an annotation group list indicating a plurality of groups one of which an annotation belongs to. Then, if the user selects one group from the plurality of groups of the displayed annotation group list, the group identification unit 603 determines the selected group as a group a refocused image of which is to be displayed. The group identification unit 603 notifies a position identification unit 604 of a group name that indicates the identified group.

Figure 14:
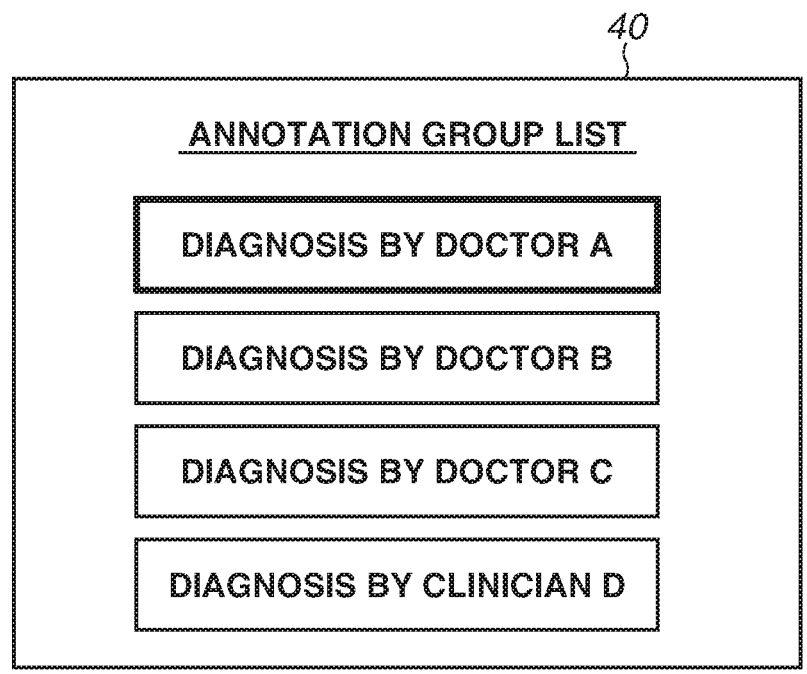
FIG. 14 illustrates a screen of a display unit that displays an annotation group list.

FIG. 14 illustrates a screen of the display unit 40 that displays an annotation group list. In the example illustrated in FIG. 14, the state in which the group "diagnosis by doctor A" is selected by the user is displayed. The group identification unit 603 may display one refocused image and then superimpose the annotation group list on the refocused image displayed on the display unit 40 to display the annotation group list.

[Flow Chart Illustrating Procedure of Image Display Apparatus 100]

Figure 15:
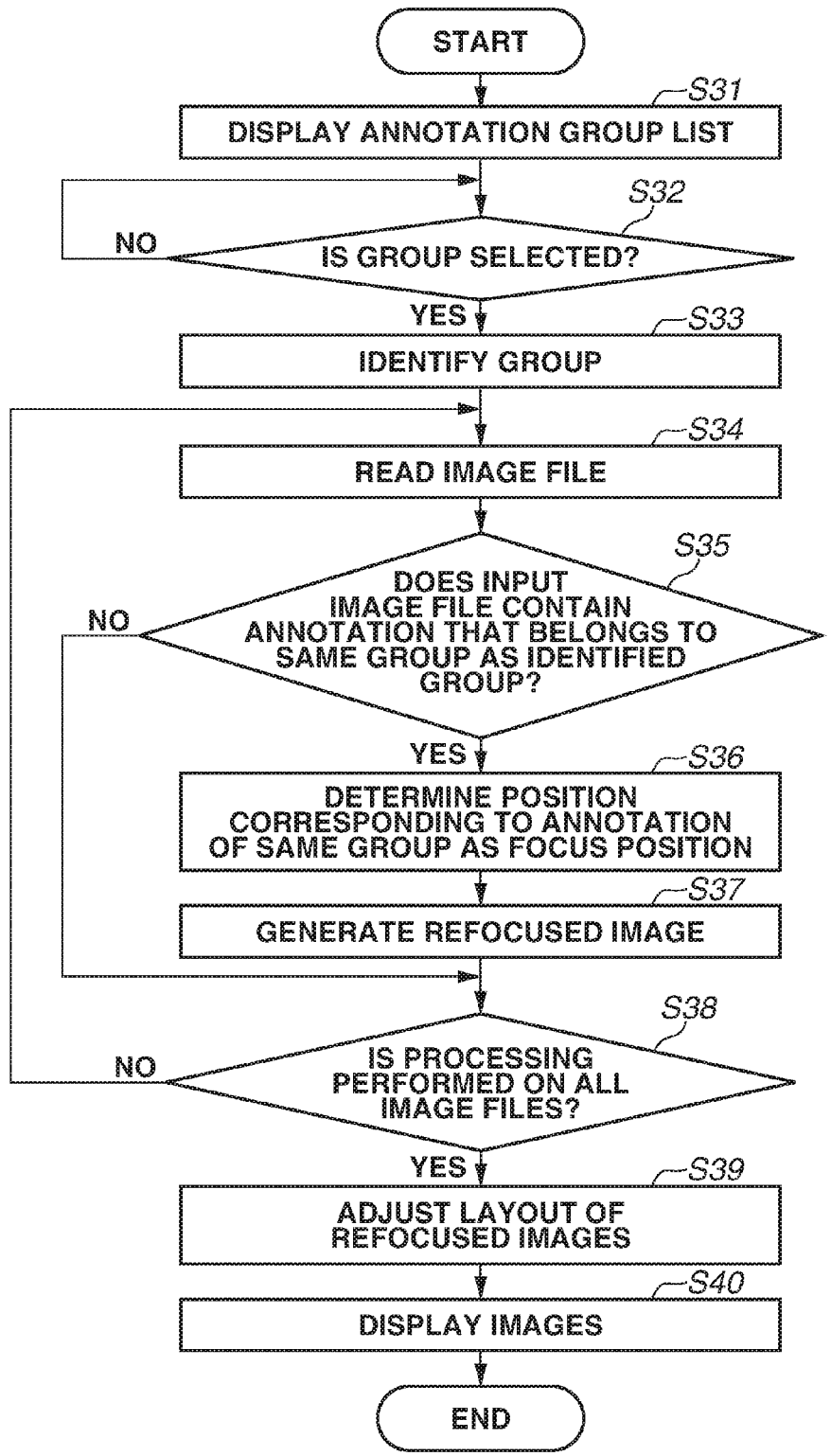
FIG. 15 is a flow chart illustrating a processing procedure of a display control method according to a second exemplary embodiment.
Figure 16A:
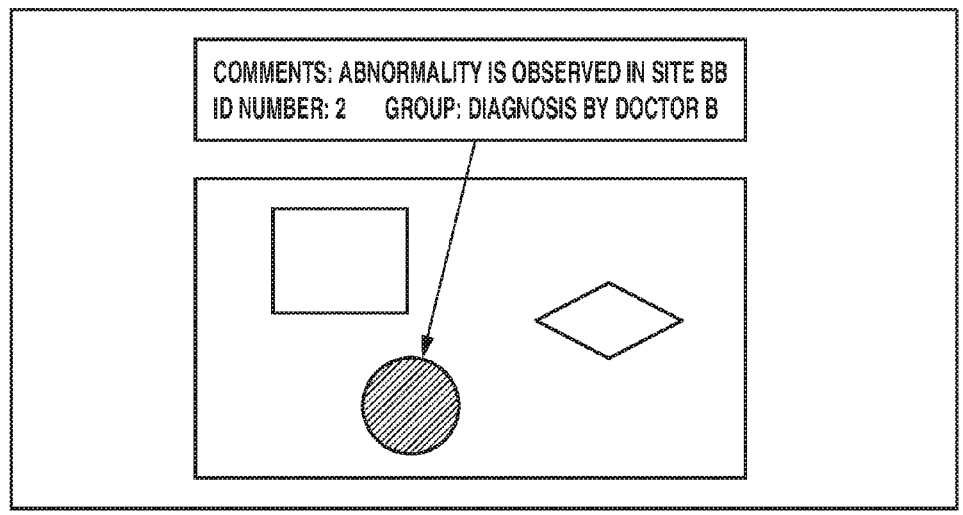
FIG. 16A is a first view illustrating a screen transition according to the second exemplary embodiment.
Figure 16B:
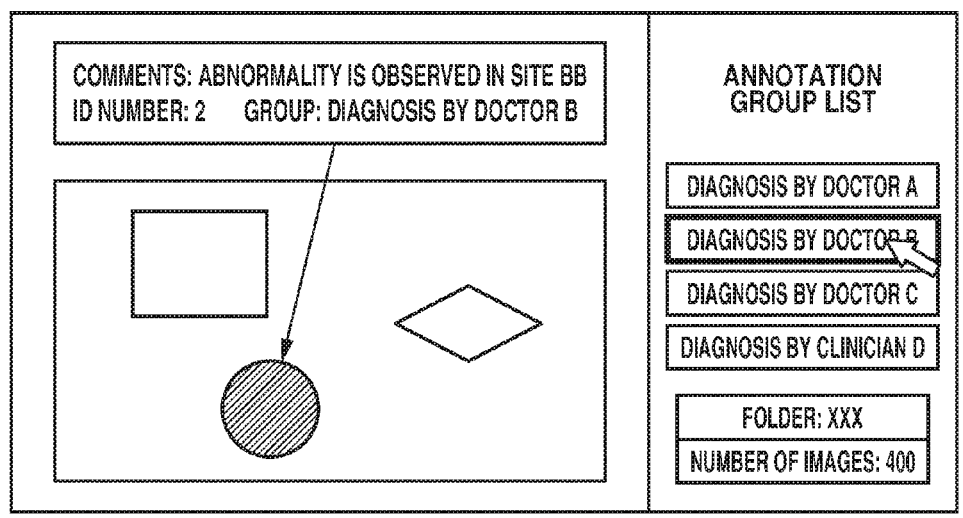
FIG. 16B is a second view illustrating a screen transition according to the second exemplary embodiment.
Figure 16C:
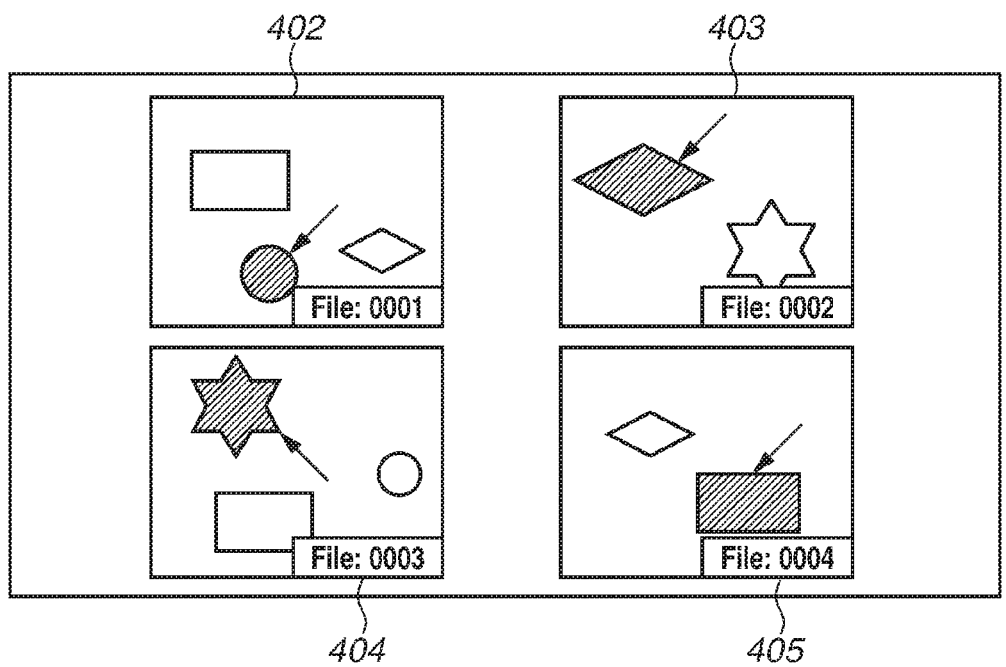
FIG. 16C is a third view illustrating a screen transition according to the second exemplary embodiment.

FIG. 15 is a flow chart illustrating a processing procedure of a display control method that is executed by the image display apparatus 100 according to the second exemplary embodiment. FIGS. 16A to 16C illustrate a screen transition according to the present exemplary embodiment. FIG. 16A illustrates a screen that is displayed when an annotation of the ID number "2" is selected by the user, as in FIG. 13A.

In step S31, if the user performs an operation to display an annotation group list, the display control unit 606 displays on the display unit 40 an annotation group list indicating a plurality of group names registered in advance, as illustrated in FIG. 16B. In this state, in step S32, an operation information acquisition unit 602 stands by until a group is selected by the user.

If any of the groups is selected by the user (YES in step S32), the operation information acquisition unit 602 notifies the group identification unit 603 of operation information for identifying the selected group. In step 333, the group identification unit 603 identifies the group selected by the user, based on the notified operation information. The group identification unit 603 may temporarily store in a storage unit 50 a group name that indicates the identified group.

Then, the image display apparatus 100 executes steps S34 to S40 and displays a plurality of refocused images with a focus position set to a position where an annotation belonging to the group selected by the user is added, as illustrated in FIG. 16C. Steps S34 to S40 are similar to steps S17 to S23 in the first exemplary embodiment that are illustrated in FIG. 12.

Advantage of Second Exemplary Embodiment

As the foregoing describes, the image display apparatus 100 according to the second exemplary embodiment displays an annotation group list so that the user can select a group; a refocused image of which is to be displayed. In this way, the image display apparatus 100 can collectively display refocused images that the user desires to view without requiring the user to perform an operation to search for an image to which an annotation belonging to a group of interest is added.

While the foregoing describes the example in which the image display apparatus 100 automatically sets the collective focusing setting after the user selects a group, this is not a limiting example. The image display apparatus 100 may display a message to prompt the user to set the collective focusing setting after the user selects a desired group from the annotation group list, and then the image display apparatus 100 may set the collective focusing setting after the user selects the collective focusing setting, as in the first exemplary embodiment.

The following describes a third exemplary embodiment. Each of the image display apparatuses 100 according to the first and second exemplary embodiments determines, as a refocused image display target, LF image data to which an annotation associated with a group identified by the group identification unit 603 is added. The third exemplary embodiment is different from the first and second exemplary embodiments in that an image display apparatus 100 according to the third exemplary embodiment collectively set a focus setting also with respect to LF image data that does not contain an annotation belonging to a group identified by a group identification unit 603.

A data acquisition unit 601 according to the present exemplary embodiment extracts, from a LF image file, default focus position data that specifies a default focus position among a respective plurality of positions in the depth direction that correspond to a plurality of pieces of LF image data. The data acquisition unit 601 outputs the extracted default focus position data to an image generation unit 605.

The image generation unit 605 generates a refocused image with a focus position set to a position specified by the default focus position data of LF image data that does not contain one or more annotations belonging to the group identified by the group identification unit 603. Specifically, with respect to LF image data as to which the position identification unit 604 notifies the image generation unit 605 of a position corresponding to an annotation belonging to a group identified by the group identification unit 603, the image generation unit 605 generates a refocused image with a focus position set to the notified position. Further, with respect to LF image data as to which the position identification unit 604 does not notify the image generation unit 605 of a position, the image generation unit 605 generates a refocused image with a focus position set to the default focus position.

The display control unit 606 displays on the display unit 40 a list of the plurality of refocused images generated by the image generation unit 605. At this time, the display control unit 606 may display on the display unit 40 information indicating that an annotation belonging to the group identified by the group identification unit 603 is not set, in association with a refocused image of LF image data that does not contain one or more annotations belonging to the group identified by the group identification unit 603. For example, in a case where a refocused image that is not associated with the group identified by the group identification unit 603 is to be displayed on the display unit 40, the display control unit 606 may display the description "this refocused image does not contain an annotation of the group 'diagnosis by doctor XX'" together with the refocused image.

[Flow Chart Illustrating Procedure of Image Display Apparatus 100]

Figure 17:
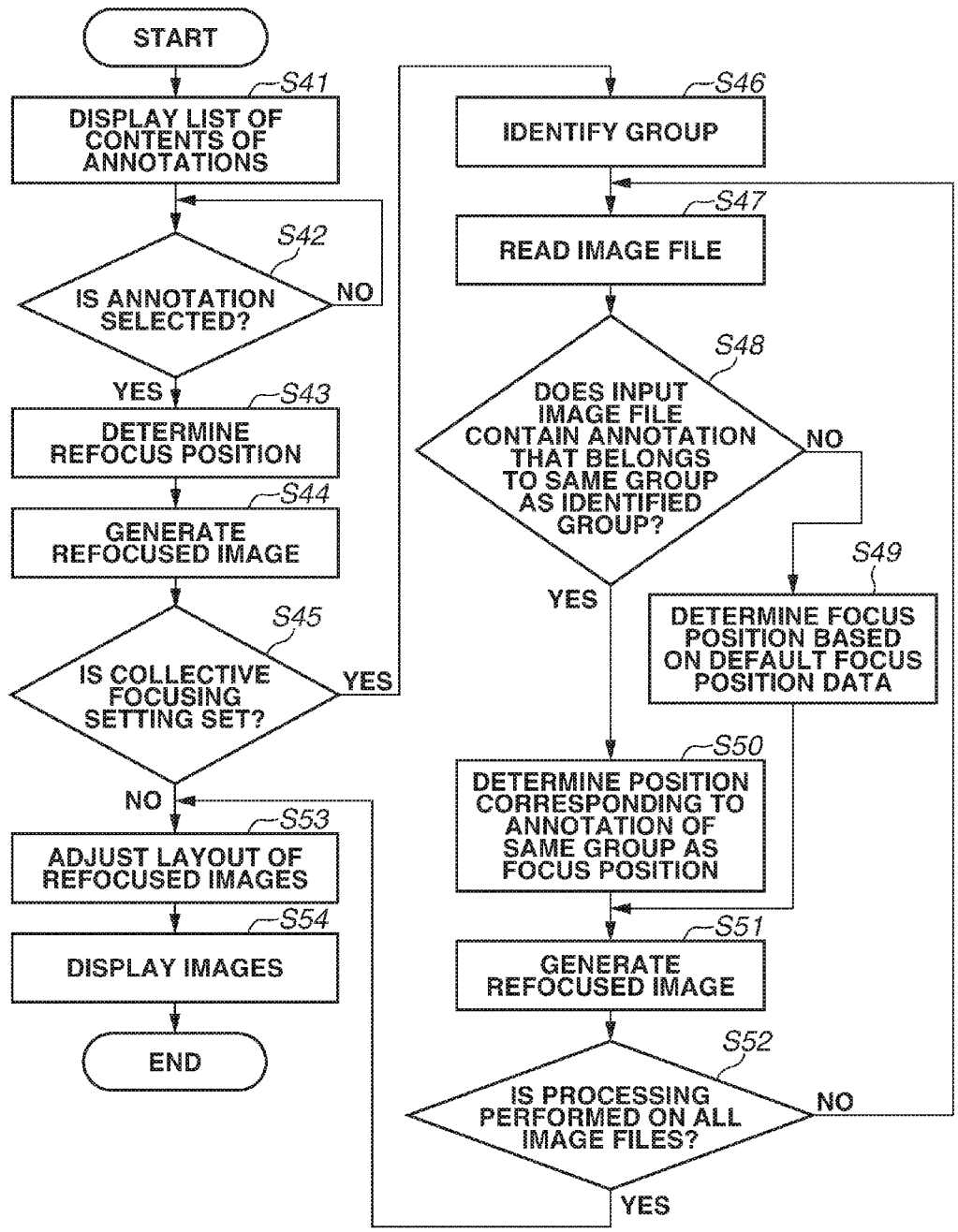
FIG. 17 is a flow chart illustrating a processing procedure of a display control method according to a third exemplary embodiment.

FIG. 17 is a flow chart illustrating a processing procedure of a display control method that is executed by the image display apparatus 100 according to the third exemplary embodiment.

Steps S41 to S48 in the flow chart illustrated in FIG. 17 respectively correspond to steps S11 to S18 in the flow chart illustrated in FIG. 12. Further, steps S50 to S54 in the flow chart illustrated in FIG. 17 respectively correspond to steps S19 to S23 in the flow chart illustrated in FIG. 12. The flow chart illustrated in FIG. 17 is different from the flow chart illustrated in FIG. 12 in that step S49 is executed between steps S48 and S51.

In step S48, the position identification unit 604 determines whether an image file read in step S47 contains an annotation that belongs to the same group as the group identified by the group identification unit 603. If the position identification unit 604 determines that the image file does not contain an annotation that belongs to the same group (NO in step S48), then in step S49, the position identification unit 604 determines a focus position specified by the default focus position data, as a focus position of the LF image data of the file, and the processing proceeds to step S51. In this way, the image display apparatus 100 can also display a refocused image of LF image data to which an annotation belonging to the same group as the group identified by the group identification unit 603 is not added.

Advantage of Third Exemplary Embodiment

As the foregoing describes, the image display apparatus 100 according to the third exemplary embodiment can display on the display unit 40 both a refocused image to which an annotation belonging to the group identified by the group identification unit 603 is added and also a refocused image to which an annotation belonging to the identified group is not added. Further, the image display apparatus 100 can display a refocused image to which an annotation belonging to the identified group is added such that the refocused image can be discriminated from other refocused images. In this way, the user can view other refocused images when viewing a refocused image to which an annotation of interest is added, where the risk of overlooking a refocused image that should be viewed can be decreased.

While exemplary embodiments of the present invention have been described above, the scope of the present invention is not limited to the disclosed exemplary embodiments, and various modifications and changes are possible within the spirit of the invention.

While the examples in which LF image data is medical image data are described in the first to third exemplary embodiments, the type of LF image data to which an exemplary embodiment of the present invention is applicable is not limited to medical image data, and an exemplary embodiment of the present invention is applicable to any type of image data. For example, there may be a case where LF image data is image data generated by capturing images of a baseball game between teams A and B. In this case, a follower of team A can add an annotation in a position with a focus on a baseball player of team A, and a follower of team B can add an annotation in a position with a focus on a baseball player of team B. Each of the annotations is to belong to different one of the group of team A or the group of team B.

Then, at the time of viewing the plurality of pieces of LF image data, the user having added the annotation or other users can collectively display a plurality of refocused images to which annotations belonging to the same group as the group of the annotation of the displayed refocused image are added, as described in the first exemplary embodiment. Further, as described in the second exemplary embodiment, the user can select a group such as team A or B and collectively display a plurality of refocused images to which annotations belonging to the selected group are added.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132583, filed Jul. 1, 2015, which is hereby incorporated by reference herein in its entirety.

What is claimed is:

1. An electronic apparatus comprising:
at least one processor; and
at least one memory storing a program which, when executed by the at least one processor, causes the electronic apparatus to:
acquire each of a plurality of pieces of refocusable image data in which a corresponding focus position being an in-focus position in a depth direction is changeable after image capturing, and a plurality of pieces of data each of which is added to a different one of the plurality of pieces of refocusable image data and associated with a position in the depth direction;
identify a group to which at least one of the plurality of pieces of acquired added data belongs;
generate, from the plurality of pieces of refocusable image data associated with the one or more pieces of added data belonging to the identified group, each of a plurality of refocused images with the corresponding focus position set to a position associated with the one or more pieces of added data belonging to the group; and
display the plurality of refocused images on a screen.

2. The electronic apparatus according to claim 1, wherein a list of the one or more pieces of added data is displayed on the screen, and
wherein a group, to which the at least one piece of added data selected from the displayed list of the one or more pieces of added data belongs, is identified.

3. The electronic apparatus according to claim 1, wherein a list of a plurality of group names corresponding to a plurality of groups is displayed on the screen, and
wherein a group corresponding to one group name selected from the displayed list of the plurality of group names is identified.

4. The electronic apparatus according to claim 1, wherein the refocused image corresponding to the refocusable image data that does not contain the one or more pieces of added data belonging to the group is not displayed on the screen.

5. The electronic apparatus according to claim 1, wherein a plurality of pieces of default focus position data, indicating a default focus position among a respective plurality of positions in the depth direction corresponding to the plurality of pieces of refocusable image data, is acquired,
wherein the plurality of refocused images, including a refocused image with a focus position set to a position specified by the default focus position data of the refocusable image data that does not contain the one or more pieces of added data belonging to the group, is generated, and
wherein the plurality of refocused images are displayed on the screen.

6. The electronic apparatus according to claim 5, wherein the electronic apparatus further displays information indicating that the one or more pieces of added data belonging to the identified group are not set, in association with the refocusable image data that does not contain the one or more pieces of added data belonging to the group.

7. The electronic apparatus according to claim 1, wherein a plurality of refocusable image files, stored in a predetermined folder and containing the refocusable image data and the one or more pieces of added data, is acquired, and
wherein each of the plurality of refocused images with the corresponding focus position set to a position associated with the plurality of pieces of added data belonging to the group is generated, based on the plurality of pieces of refocusable image data contained in the plurality of refocusable image files.

8. The electronic apparatus according to claim 1, wherein the refocusable image data is light-field image data.

9. A non-transitory computer-readable recording medium storing a program that causes a computer to execute:
acquiring a plurality of pieces of refocusable image data in which a focus position being an in-focus position in a depth direction is changeable after image capturing, and a plurality of pieces of data each of which is added to a different one of the plurality of pieces of refocusable image data and associated with a position in the depth direction;
identifying a group to which at least one of the plurality of pieces of added data acquired by the acquiring belongs;
generating, from the plurality of pieces of refocusable image data associated with the one or more pieces of added data belonging to the identified group, each of a plurality of refocused images with the corresponding focus position set to a position associated with the one or more pieces of added data belonging to the group;
and displaying the plurality of refocused images on a screen.

10. The non-transitory computer-readable recording medium according to claim 9, wherein the program further comprises, prior to the identifying, displaying on the screen a list of the one or more pieces of acquired added data,
and wherein the identifying identifies a group to which the at least one piece of added data selected from the displayed list of the one or more pieces of added data belongs.

11. The non-transitory computer-readable recording medium according to claim 9, wherein the program further comprises, prior to the identifying, displaying on the screen a list of a plurality of group names corresponding to a plurality of groups,
and wherein the identifying identifies a group corresponding to one group name selected from the displayed list of the plurality of group names.

12. The non-transitory computer-readable recording medium according to claim 9, wherein the displaying does not display on the screen the refocused image corresponding to the refocusable image data that does not contain the one or more pieces of added data belonging to the group identified by the generating.

13. The non-transitory computer-readable recording medium according to claim 9, wherein:
the acquiring acquires a plurality of pieces of default focus position data indicating a default focus position among a respective plurality of positions in the depth direction corresponding to the plurality of pieces of refocusable image data;
the generating generates the plurality of refocused images including a refocused image with a focus position set to a position specified by the default focus position data of the refocusable image data that does not contain the one or more pieces of added data identified by the generating;

and the displaying displays on the screen the plurality of refocused images generated by the generating.

14. The non-transitory computer-readable recording medium according to claim 13, wherein the displaying displays on the screen information indicating that the added data belonging to the group identified by the identifying is not set, in association with the refocusable image data that does not contain the one or more pieces of added data identified by the generating.

15. The non-transitory computer-readable recording medium according to claim 9, wherein the acquiring acquires a plurality of refocusable image files stored in a predetermined folder and containing the refocusable image data and the one or more pieces of added data, and wherein the generating generates each of the plurality of refocused images with the corresponding focus position set to a position associated with the plurality of pieces of added data identified by the generating, based on the plurality of pieces of refocusable image data contained in the plurality of refocusable image files.

16. The computer-readable recording medium according to claim 9, wherein the refocusable image data is light-field image data.

17. A display control method comprising:

acquiring each of a plurality of pieces of refocusable image data in which a corresponding focus position being an in-focus position in a depth direction is changeable after image capturing, and a plurality of pieces of data each of which is added to a different one of the plurality of pieces of refocusable image data and associated with a position in the depth direction;

identifying a group to which at least one of the plurality of pieces of added data acquired by the acquiring belongs;

generating, from the plurality of pieces of refocusable image data associated with the one or more pieces of added data belonging to the identified group, each of a plurality of refocused images with the corresponding focus position set to a position associated with the one or more pieces of added data belonging to the group; and displaying the plurality of refocused images on a screen.

* * * * *